3,241,592
TIRE CONTAINING ETHYLENE-PROPYLENE CO-POLYMER COATED CORDS AND METHOD OF MAKING SAME
Loy D. Sneary, Bartlesville, Okla., assignor to Phillips Petroleum Company, a corporation of Delaware
No Drawing. Filed June 7, 1962, Ser. No. 200,622
10 Claims. (Cl. 152—330)

This invention relates to tires and method of making tires wherein the rubber is an ethylene-propylene copolymer. In one aspect the invention relates to a particular method for effecting a bond between the ethylene-propylene rubber and the tire cord. In another aspect the invention relates to a novel and improved tire.

In the manufacture of tires, various materials have been suggested as bonding agents for bonding the rubber of the tread and sidewalls to the tire cord. These materials have included rubber latex, dispersions of rubber, and solutions of synthetic rubber such as a butadiene-vinyl heterocyclic nitrogen base copolymer.

Recently rubbery copolymers of ethylene and propylene have been developed which display properties which make these copolymers particularly applicable for use in tires, belts and the like. For example, a copolymer rubber containing about 60 to 70 mol percent ethylene and about 30 to 40 mol percent propylene displays properties of weathering, ozone resistance, and wear resistance which are superior to those properties of natural and conventional synthetic rubber such as SBR (butadiene-styrene copolymer rubber). In the manufacture of tires utilizing ethylene-propylene copolymer rubber (EPR) difficulty has been experienced in obtaining a satisfactory bond between the rubber and the fabric of the tire carcass. This has been true when either nylon or rayon has been used as the fabric for the tire carcass. The bonding agents which have proved successful in bonding natural and conventional synthetic rubbers to these fabrics have not provided a satisfactory bond between these fabrics and the ethylene-propylene copolymer rubber.

Accordingly a principal object of the invention is the provision of a method for bonding together a fabric and an ethylene-propylene copolymer rubber. Another object of the invention is to provide a process for effecting a satisfactory bond between an ethylene-propylene copolymer rubber and tire cord. A further object of the invention is to provide an improved tire formed of ethylene-propylene copolymer rubber. A further object of the invention is to eliminate the need for extraneous bonding agents, adhesives and the like ordinarily used in bonding tire cords to a tire carcass. A still further object is to provide a tire cord which has a coating of ethylene-propylene rubber thereon.

Other objects, aspects and advantages of the invention will be apparent from a study of the disclosure and the appended claims to the invention.

In accordance with the invention a suitable catalyst is placed on the tire cord, the thus treated tire cord is introduced into the presence of ethylene and propylene under suitable polymerization conditions to cause the formation of an ethylene-propylene copolymer rubber on the tire cord, and the tire cord which now contains a layer of ethylene-propylene rubber chemically bonded to the cord is vulcanized onto the ethylene-propylene copolymer rubber tire carcass through the utilization of suitable curing agents.

The ethylene-propylene polymers which are used to coat the tire cords can be made by means well known to those skilled in the art; for example, by polymerizing the monomers in the presence of a catalyst comprising a mixture of a compound of a metal of Groups IV–B, V–B or VI–B of the periodic table and an organometal compound of an alkali metal, alkaline earth metal, zinc, aluminum or rare earth metals. Representative examples are vanadium tetrachloride and diisobutyl aluminum, vanadium oxytrichloride and ethyl aluminum, and titanium tetrachloride and methylmagnesium bromide. The periodic table designations utilized in the specifications and claims are in accordance with the classification set forth on pages 56–57 of Lange's Handbook of Chemistry, 8th ed., 1952.

The ethylene-propylene rubber copolymers produced with the above-described catalyst system contain about 60–70 mol percent ethylene and 40–30 percent propylene. This specific composition is most useful in tire applications. However, other compositions with varying ratios of ethylene-propylene can be produced.

The catalyst can be placed or impregnated on the tire cord by any suitable means, such as by spraying a catalyst solution onto the tire cord, by soaking the tire cord in a solution of the catalyst, or by continuously running strands of tire cord through a bath of the catalyst solution, followed by evaporating the solvent. Each of these operations is preferably carried out in the absence of air as air is a catalyst poison. Furthermore, many of the organometals are highly pyrophoric in the presence of air.

After the catalyst has been placed on the tire cords polymerization is begun by introducing the treated cord into the presence of the monomers. This can be done by moving the tire cord in strand like form from the catalyst impregnation step into a closed reactor containing the monomers and operating at suitable polymerizing conditions. While the monomers can be utilized in their gaseous forms, the monomers are preferably dissolved in a solvent that is nondeleterious and which will not dissolve the polymer that polymerizes on the tire cords. Suitable solvents are aliphatic, alkylaromatic, aromatic, and cycloaliphatic hydorcarbons, such as for example, pentane, hexane, heptene, toluene, benzene, and cyclohexene. The temperature at which the polyemrization can be carried out can range from 0–100° C., while pressures can vary from atmospheric to 500 p.s.i.g. Suitable reaction times are in the range of 20 minutes to 2 hours. The preferred conditions are 25–45° C., and 1 to 2 atmospheres and 30 minutes to 1 hour. After the polyemrization has taken place the cords, now coated with ethylene-propylene copolymer rubber, can be withdrawn from the reactor and dried to remove the solvent.

After the solvent has been removed the treated cord, now containing a layer of ethylene-propylene copolymer rubber which is chemically bonded to the fabric of the cord, is ready for immediate use; however, it can also be stored for indefinite periods at ordinary temperatures with no deleterious results with respect to its ability to be bonded to ethylene-propylene rubber. The treated tire cord can be vulcanized onto the tire carcass using curing agents that are suitable for vulcanizing ethylene-propylene rubber. Examples of suitable curing agents are organic peroxides such as dicumyl peroxide. More generally curing agents coming under the generic class of di(aralkyl) peroxide can be used. Time of cure can range from 1 minute to 45 minutes with corresponding ranges of temperature for example, from 150°–190° C.

While the invention is directed to making a tire by polymerizing ethylene-propylene copolymer onto tire cords of nylon, rayon, cotton, and the like, it is within the scope of the invention to employ a terpolymer, using as a third monomer materials such as dicyclopentadiene, vinyl cyclohexane, isobutylene, isoprene and butadiene.

The following example is presented in further illustration of the invention but is not to be unduly construed in limitation thereof:

Specific example

A rayon tire cord is soaked in a catalyst comprising a mixture of 0.1 mole of vanadium tetrachloride in tetrachloroethylene and triisobutyl aluminum (TIBA) in tetrachloroethylene with the mole ratio of TIBA to $VCl_4$ being 3.5:2.

The soaking operation is carried out at room temperature and in the absence of moisture and oxygen for a period of 20 minutes.

The rayon cord having the catalyst components soaked into it is then continuously conveyed through a reaction chamber containing ethylene and propylene dissolved in tetrachloroethylene. The mole ratio of monomer dissolved in the solvent is 1 mole of $C_2H_4$ to 3 moles $C_3H_6$. Polymerization is carried out at 50° C. and atmospheric pressure for a period of 45 minutes. After the cord leaves the polymerization chamber it is treated with 5 percent aqueous solution of HCl, then water washed to remove any catalyst residues, and then dried. The dried cord, which now has a coating of ethylene-propylene copolymer rubber chemically bonded to the cord fabric, is embedded in a mass of uncured rubber, and the resulting body of rubber is subjected to a conventional curing treatment and vulcanization.

Reasonable variation and modification are possible within the scope of the foregoing disclosure and the appended claims to the invention.

I claim:

1. In a process for making a tire, the improvement consisting essentially of impregnating tire cords with an ethylene-propylene copolymerization catalyst comprising a mixture of a compound of a metal selected from the group consisting of Groups IV-B, V-B and VI-B of the periodic table, and an organic compound of a metal selected from the group consisting of alkali metals, alkaline earth metals, rare earth metals, zinc, and aluminum; introducing the thus impregnated tire cords into a reaction zone; contacting said thus impregnated tire cords in said reaction zone with ethylene and propylene under polymerization conditions to obtain tire cords having a layer of ethylene-propylene copolymer rubber thereon; contacting said tire cords having a layer of ethylene-propylene copolymer rubber with additional ethylene-propylene copolymer rubber and a curing agent under vulcanizing conditions to obtain a tire carcass of ethylene-propylene copolymer rubber bonded to the tire cords.

2. A process in accordance with claim 1 wherein said tire cords are selected from the group consisting of nylon, rayon, and cotton.

3. A process in accordance with claim 1 wherein said polymerization conditions comprise a temperature in the range of about 0 to about 100° C. and a pressure in the range of about atmospheric to about 150 p.s.i.g.

4. A process in accordance with claim 1 wherein said ethylene and said propylene are dissolved in a solvent therefor.

5. A process in accordance with claim 1 wherein said curing agent is a di(aralkyl) peroxide.

6. A process in accordance with claim 1 wherein said vulcanizing conditions comprise a temperature in the range of about 150 to about 190° C. for a time in the range of about 1 to about 45 minutes.

7. A method in accordance with claim 1 wherein said additional ethylene-propylene copolymer rubber comprises a terpolymer.

8. A tire made in accordance with the process of claim 1.

9. In a process for making a reinforced rubber article, the improvement consisting essentially of impregnating reinforcing cords with an ethylene-propylene copolymerization catalyst comprising a mixture of a compound of a metal selected from the group consisting of Groups IV-B, V-B and VI-B of the periodic table, and an organic compound of a metal selected from the group consisting of alkali metals, alkaline earth metals, rare earth metals, zinc, and aluminum; introducing the thus impregnated cords into a reaction zone; contacting said thus impregnated cords in said reaction zone with ethylene and propylene under polymerization conditions to obtain cords having a layer of ethylene-propylene copolymer rubber thereon; contacting said cords having a layer of ethylene-propylene copolymer rubber with additional ethylene-propylene copolymer rubber and a curing agent under vulcanization conditions to obtain a reinforced article of ethylene-propylene copolymer rubber bonded to the cords.

10. An article of manufacture made in accordance with claim 9.

References Cited by the Examiner

UNITED STATES PATENTS

| | | | |
|---|---|---|---|
| 2,270,285 | 1/1942 | Frolich | 117—119.2 |
| 2,316,274 | 4/1943 | Mitchell. | |
| 2,748,049 | 5/1956 | Kalafus. | |
| 2,765,297 | 10/1956 | Heiligmann et al. | 260—88.2 |
| 2,838,477 | 6/1958 | Roelen et al. | 260—88.2 |
| 2,839,443 | 6/1958 | Fleming. | |
| 3,166,538 | 1/1965 | Olson et al. | 260—88.2 |

OTHER REFERENCES

"Linear and Stereoregular Addition Polymers: Polymerization With Controlled Propagation," Gaylor and Mark, June 11, 1959, pp. 508–509.

JACOB H. STEINBERG, *Primary Examiner.*

HAROLD ANSHER, ALEXANDER WYMAN,
*Examiners.*